K. ALQUIST.
GEARING.
APPLICATION FILED JUNE 22, 1918.
1,351,322.
Patented Aug. 31, 1920.
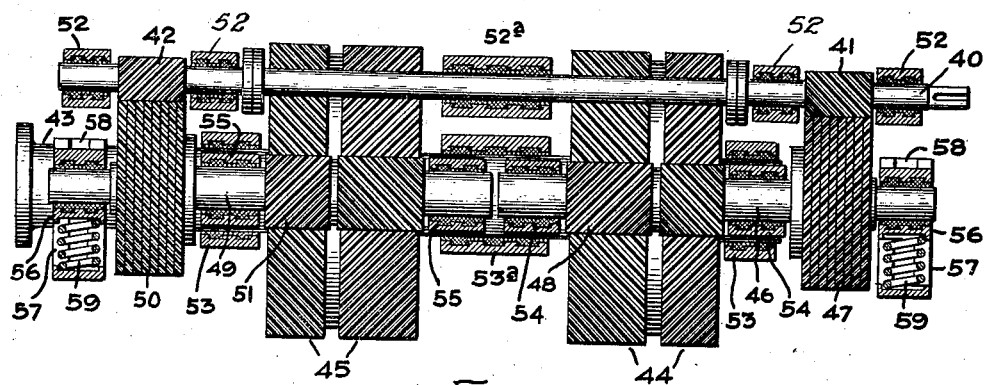
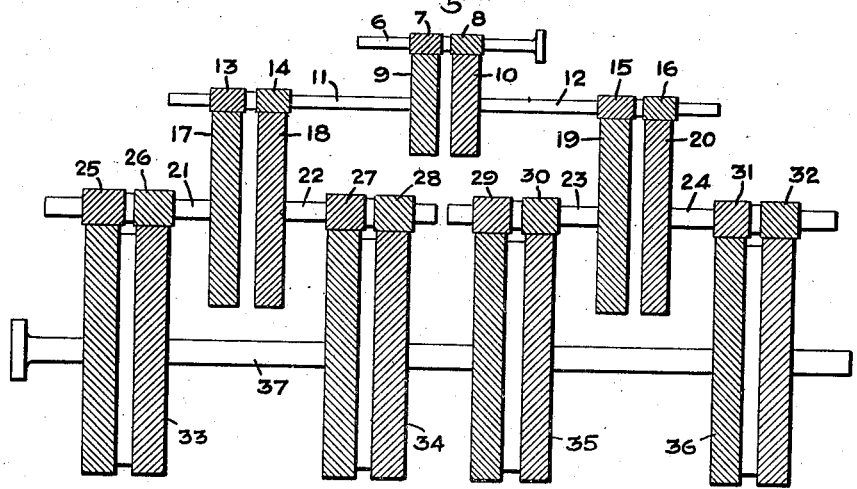
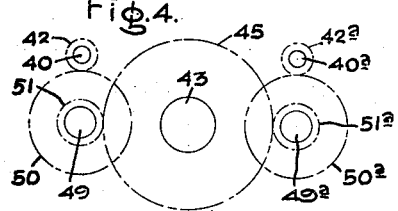
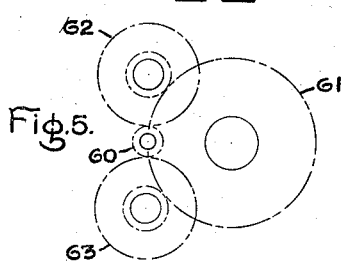
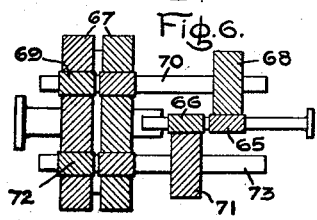
Inventor:
Karl Alquist,
by Albert G. Davis
His Attorney.

UNITED STATES PATENT OFFICE.

KARL ALQUIST, OF SCHENECTADY, NEW YORK.

GEARING.

1,351,322.  Specification of Letters Patent.  Patented Aug. 31, 1920.

Application filed June 22, 1918. Serial No. 241,347.

*To all whom it may concern:*

Be it known that I, KARL ALQUIST, a subject of the King of Sweden, residing at Schenectady, county of Schenectady, State of New York, have invented certain new and useful Improvements in Gearing, of which the following is a specification.

The present invention relates to helical gearing of the multiple reduction type wherein power is transmitted between high speed pinion means on a high speed shaft and low speed gear wheel means on a low speed shaft through a plurality of intermediate speed shafts which transmit the load in parallel, such intermediate speed shafts carrying suitable gearing for meshing with the high speed pinion means and the low speed gear wheel means. This is a known arrangement of gearing and while it is here referred to particularly as being a reduction gearing, it will be understood of course, that any such arrangement is not necessarily limited to such use, but may be used for speed multiplication as well.

One of the problems in connection with the gearing of the above referred to type is to obtain and maintain equal division of the load between or among the intermediate speed shafts so that each transmits its proper share of the total load and one of the objects of my invention is to provide an improved arrangement which will accomplish this result in a very satisfactory manner.

A gearing when designed for transmitting large power has of necessity comparatively wide faces, especially in the low speed end, and the difficulty in obtaining proper alinement and uniform meshing between gear wheels having wide faces is well understood. A further object of my invention is to provide an improved arrangement or structure in a multiple reduction gearing, wherein the difficulties of obtaining correct and uniform meshing between the gear wheels is to a great extent lessened or overcome because of the reduction in width of face of each individual pinion and wheel in mesh.

For a consideration of what I believe to be novel and my invention, attention is directed to the following specification, and the claims appended thereto.

In the drawing, Figure 1 is a side elevation of a gearing embodying my invention; Fig. 2 is a diagrammatic view of a gearing; Fig. 3 is a detail view showing a spring support for a shaft end; Figs. 4 and 5 are diagrammatic end views of other forms of gearing, and Fig. 6 is a diagrammatic view of another modification.

In carrying out my invention, I provide on the high speed shaft a double helical or herringbone pinion comprising two parts, members or halves, one having right hand helical teeth and the other left hand helical teeth and I provide on the low speed shaft double helical gear wheel means which may be in the form of one double helical gear wheel or more than one. I then transmit power separately from each pinion member, part or half, to said double helical gear wheel means through intermediate speed shafts each of which carries a gear wheel having single helical teeth and a pinion having preferably double helical teeth. In the case of a double reduction gearing the gear wheel on each intermediate speed shaft meshes with one or the other of the high speed pinion members, and the double helical pinion on such shaft meshes with the low speed double helical gear wheel means, which latter may be in the form of one or more double helical gear wheels as pointed out above. In the case of a reduction greater than a double reduction additional intermediate gearing is introduced as is explained hereinafter.

The principles involved in my invention can be best understood by a consideration of the diagrammatic view shown in Fig. 2. Referring to this figure, 6 is a high speed shaft upon which is mounted a high speed pinion of the double helical or herringbone type such pinion comprising the two halves or members 7 and 8, one having right hand helical teeth and the other left hand helical teeth. The pinion member 7 meshes with a gear wheel 9 having single helical teeth and the pinion member 8 meshes with a gear wheel 10 having single helical teeth. Of the gear wheels 9 and 10, one has right hand helical teeth and the other left hand helical teeth. Gear wheels 9 and 10 are carried on separate shafts 11 and 12 respectively upon which are double helical pinions comprising halves or members 13 and 14 in the one case and 15 and 16 in the other case. Pinion members 13, 14, 15 and 16 mesh with single helical gear wheels 17, 18, 19 and 20 respectively mounted on separate shafts 21, 22, 23 and 24 and provided with right hand or left hand helical teeth to correspond to the pinion members with which they mesh. On shafts 21, 22, 23 and 24 are double helical pinions comprising halves or members 25 and 26, 27 and 28, 29 and 30, and 31 and 32, and these pinions in turn mesh with low speed double helical gear wheels 33, 34, 35 and 36 mounted on a shaft 37. This forms as will be clear, a triple reduction gear. A quadruple reduction can be effected by carrying the arrangement one step farther while a double reduction can be formed by placing gear wheels 17, 18, 19 and 20 on a common shaft and omitting the remainder of the gearing illustrated. Obviously a multiple reduction of any value may be obtained and a triple reduction is shown only as an example. Now with this arrangement it will be seen that the load on shaft 6 is divided between shafts 11 and 12, and that the loads on shafts 11 and 12 are again equally divided between shafts 21 and 22, and 23 and 24 respectively. As a result of this arrangement there are several sets of pinions and gear wheels at the low speed end of the gearing, each set carrying its proper share of the load over a comparatively narrow width of face, and hence the problem of obtaining and maintaining correct alinement and meshing is materially less difficult. Furthermore, since each of the double helical pinions on shafts 21, 22, 23 and 24 is driven from a single helical gear wheel, such shafts can always be automatically adjusted or positioned axially by the pinions to insure correct meshing of such pinions with the low speed gear wheels 33, 34, 35 and 36. This will be clear when it is considered that the gear wheels 17, 18, 19 and 20 will mesh correctly with pinion members 13, 14, 15 and 16 irrespective of their exact axial positions, for any axial movement can always be taken care of by a slight circumferential movement.

Referring now to Figs. 1 and 4 which illustrate specifically a double reduction gearing embodying my invention, 40 indicates a high speed driving shaft upon which is mounted a high speed pinion comprising a pinion member 41 and a pinion member 42. One of these pinion members is shown as having right hand helical teeth and the other left hand helical teeth, and they may be considered as being either separate pinions mounted on the same shaft, or, since the teeth on them are complementary, as the two parts or halves of a pinion of the double helical or herringbone type. 43 indicates a low speed driven shaft upon which are mounted the two low speed gear wheel members or parts 44 and 45. The gear wheel members 44 and 45 may likewise be considered as being two separate gear wheels mounted on a common shaft, or as being the two halves or parts of a single gear wheel. Now, according to my invention, power is transmitted from the two pinion members 41 and 42 to the two gear wheel members 44 and 45 respectively by two separate and independent shafts, each having suitable gear wheels thereon for meshing with pinion members 41 and 42 and with gear wheel members 44 and 45. One of these shafts is indicated at 46 and is provided with a high speed gear wheel member 47 which meshes with the pinion member 41 and with a low speed pinion member 48, which meshes with the low speed gear wheel member 44. The other shaft is indicated at 49 and it carries a high speed gear wheel member 50 which meshes with the pinion member 42 and a low speed pinion member 51, which meshes with the low speed gear wheel member 45. The high speed gear wheel members 47 and 50 are provided, one with right hand helical teeth and the other with left hand helical teeth, so as to mesh properly with the pinion members 41 and 42, and they may be considered as being separate gear wheels or they may be considered as being the two halves or parts of a gear wheel having double helical or herringbone teeth, as pointed out above in connection with pinion members 41 and 42. The shaft 40 is provided with suitable bearings, there being a bearing 52 upon each side of the pinion members 41 and 42 and a central bearing 52ª. The shaft 43 is provided with end bearings 53 and an intermediate bearing 53ª. In the case of the shafts 46 and 49, I preferably provide only two bearings for each, one on each side of the low speed pinion members 48 and 51 respectively, as indicated at 54 in the case of the shaft 46 and 55 in the case of the shaft 49. I then overhang the high speed gear wheels 47 and 50 on the ends of the shafts 46 and 49 respectively, and support the outer ends of such shafts on suitable spring supports. In the present instance, these spring supports are shown as comprising a supporting member 56 in which the shaft rotates, and which is guided vertically by a frame 57 provided with grooves 58 in which tongues on the supporting member 56 are guided. Beneath the supporting members 56 are suitable springs 59 which are sufficiently heavy to substantially balance the weight of the overhung parts. An arrangement of this character is more fully described in my co-pending application, Serial Number 241,346, filed of even date herewith, and as it forms the subject matter of such application, this particular structure is not claimed herein.

As will be clear, the axial thrust on the shaft 46 due to gear wheel 47 is in one direction and the axial thrust on the shaft 49 due to gear wheel 50 is in the opposite direction, and in order to balance these axial thrusts I preferably provide the gear wheel member 44 and pinion member 48, and gear wheel member 45 and pinion member 51, each with teeth of the double helical or herringbone type, and I make the two parts of unequal width as shown so that the axial thrusts on the shafts 46 and 49 are substantially balanced. That is to say, the axial thrust of gear wheel 47 and the right hand part of pinion 48 is balanced by the left hand part of pinion 48 and likewise the axial thrust of gear wheel 50 and the left hand part of pinion 51 is balanced by the right hand part of pinion 51.

In the present instance, the gear wheel members 47 and 50 are shown as being of the flexible type invented by me and comprising a plurality of disks or plates which are fixed together at their central portions and slightly spaced apart at their periphery, so they can yield axially under tooth pressure. It will be understood, however, that my invention is not necessarily limited thereto.

With the above described arrangement, it will be seen that I have only one-half the width of face to deal with that would be present were the pinion members 48 and 51 and gear wheel members 47 and 50 one continuous structure and mounted upon the same shaft. This is of particular importance in the case of the pinion members 48 and 51 and minimizes to a great extent the difficulty encountered in obtaining correct meshing between such pinion members and the low speed driven gear wheel.

An arrangement is shown herein wherein the high speed pinion members 41 and 42 are spaced a considerable distance apart, so as to leave a length of shaft between them, and the symmetrical arrangement and other advantages which results due to this and to the placing of the high speed gear wheel members 47 and 50 one on each side of the low speed gear wheel members 44 and 45 is set forth and claimed in my application Serial No. 210,955, filed January 9, 1918, and no claim is accordingly made to such arrangement *per se* in the present application. I preferably utilize such an arrangement in connection with the present invention because of its advantageous features, as set forth in the application just referred to. It will be understood, however, that the present invention may be carried out in connection with other arrangements if found desirable.

The left hand side of Fig. 4 shows diagrammatically an end view of a gearing as shown in Fig 1, the view being taken as looking toward the right hand end of Fig. 1. A single drive as indicated on the left hand side of Fig. 2 may be utilized alone, or if desired a second drive may be utilized in connection with it as shown upon the right hand side of Fig. 4 wherein the same reference numerals are used to indicate corresponding parts, except the exponent *a* is applied thereto, thus providing a double drive. Such a double drive arrangement may be very advantageously used for example, in the case of a marine installation wherein a high pressure turbine and a low pressure turbine are provided having separate shafts, one being connected to the driving shaft 40 and the other to driving shaft 40ª.

In Fig. 5 is indicated an arrangement similar to Fig. 1 except that the pinion members 60 drive the gear wheel members 61 through two sets of intermediate gear wheels which transmit the load in parallel. One of such intermediate sets is indicated at 62 and the other at 63.

In Fig. 6 I have shown another form which my invention may take which differs from Fig. 1 in that all the low speed pinions mesh with the same low speed gear wheel, there being two such pinions in the present instance. The high speed pinion comprises two pinion members 65 and 66 and the low speed gear wheel means comprise the double helical gear wheel 67. Power is transmitted from pinion member 65 to gear wheel 67 by single helical gear wheel 68 and low speed double helical pinions 69 both carried by shaft 70, and it is transmitted from pinion member 66 to gear wheel 67 by single helical gear wheel 71 and low speed double helical pinion 72 both carried by shaft 73. A gearing as shown in this figure is more particularly described and claimed and forms the subject matter of my application Serial No. 203,064, filed November 20, 1917.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a gearing, the combination of a high speed shaft, right hand and left hand helical pinion members thereon, a low speed shaft, a plurality of intermediate speed shafts through which power is transmitted between the high speed shaft and the low speed shaft, and a helical gear wheel having single helical teeth on each intermediate speed shaft which meshes with only one of said pinion members, whereby one intermediate speed shaft transmits power from only one of said pinion members and the other intermediate speed shaft transmits power from only the other of said pinion members.

2. In a gearing, the combination of a high speed shaft, a right hand helical pinion member thereon and a left hand helical pinion member thereon, a low speed shaft, intermediate speed shafts through which power is transmitted between the high speed shaft and the low speed shaft, a helical gear wheel on one of said intermediate speed shafts having single helical teeth which mesh with said right hand helical pinion member only, and a helical gear wheel on another of said intermediate speed shafts having single helical teeth which mesh with said left hand helical pinion member only.

3. In a gearing, the combination of a high speed shaft, right hand and left hand helical pinion members thereon, a low speed shaft, a plurality of intermediate speed shafts through which power is transmitted from one shaft to the other, and a single helical gear wheel and a double helical pinion on each intermediate speed shaft, said single helical gear wheels meshing each with one only of said pinion members on the high speed shaft.

4. In a gearing, the combination of a high speed shaft, right hand and left hand helical pinion members thereon, a low speed shaft, gear wheel means thereon, an intermediate speed shaft, a right hand helical gear wheel thereon which meshes with said right hand helical pinion member only, a second intermediate speed shaft, a left hand helical gear wheel thereon which meshes with said left hand helical pinion member only, and pinions on each of said intermediate speed shafts through which power is transmitted to said low speed gear wheel means.

5. In a gearing, the combination of a high speed shaft, right hand and left hand helical pinion members thereon, a low speed shaft, gear wheel means thereon, an intermediate speed shaft, a right hand helical gear wheel thereon which meshes with said right hand helical pinion member only, a second intermediate speed shaft, a left hand helical gear wheel thereon which meshes with said left hand helical pinion member only, and pinions on each of said intermediate speed shafts which mesh with said low speed gear wheel means.

6. In a gearing, the combination of a high speed shaft, right hand and left hand helical pinion members thereon, a low speed shaft, double helical gear wheel means thereon, an intermediate speed shaft, a right hand helical gear wheel thereon which meshes with said right hand helical pinion member only, a second intermediate speed shaft, a left hand helical gear wheel thereon which meshes with said left hand helical pinion member only, and double helical pinions on each of said intermediate speed shafts through which power is transmitted to said low speed gear wheel means.

7. In a gearing, the combination of a high speed shaft, right hand and left hand helical pinion members thereon, a low speed shaft, double helical gear wheel means thereon, an intermediate speed shaft, a right hand helical gear wheel thereon which meshes with said right hand helical pinion member only, a second intermediate speed shaft, a left hand helical gear wheel thereon which meshes with said left hand helical pinion member only, and double helical pinions on each of said intermediate speed shafts which mesh with said low speed gear wheel means.

8. In a gearing, the combination of a high speed shaft, a high speed pinion thereon comprising two members one of which has right hand helical teeth and the other left hand helical teeth, a low speed shaft, gear wheel means thereon with double helical teeth, intermediate speed shafts through which power is transmitted between the pinion members and the gear wheel means, and a gear wheel with single helical teeth and a pinion with double helical teeth on each intermediate speed shaft.

9. In a gearing, the combination of a high speed shaft, a high speed pinion thereon comprising two members one of which has right hand helical teeth and the other left hand helical teeth, a low speed shaft, a plurality of gear wheel members thereon each having double helical teeth, intermediate speed shafts through which power is transmitted between the pinion members and the gear wheel members, and a gear wheel with single helical teeth and a pinion with double helical teeth on each intermediate speed shaft.

10. In a gearing, the combination of a high speed shaft, two pinion members mounted thereon, one of which has right hand helical teeth and the other left hand helical teeth, a low speed shaft, a plurality of gear wheel members mounted thereon, each of which has double helical teeth, and independent sets of intermediate gear wheel members each of which sets transmits power between a pinion member and certain of the gear wheel members.

11. In a gearing, the combination of a high speed shaft, two pinion members mounted thereon, one of which has right hand helical teeth and the other left hand helical teeth, a low speed shaft, two gear wheel members mounted thereon, each of which has double helical teeth, a plurality of intermediate speed shafts, and gear wheels on said intermediate speed shafts which transmit power between the pinion members and the gear wheel members.

12. In a gearing, the combination of a high speed shaft, two pinion members thereon, one of which has right hand helical teeth and the other left hand helical teeth, a low speed shaft, two gear wheel members thereon each having double helical teeth, an intermediate speed shaft associated with each pinion member, and helical gearing means on each intermediate speed shaft for transmitting power between such pinion member and a gear wheel member.

13. In a gearing, the combination of a high speed shaft, two pinions members mounted thereon, one of which has right hand helical teeth and the other left hand helical teeth, a low speed shaft, a plurality of gear wheel members mounted thereon each having double helical teeth, axially alined intermediate speed shafts, and helical gear wheel means on each of said intermediate speed shafts which transmits power between a pinion member and certain of the gear wheel members.

14. In a gearing, the combination of a driving shaft, a pair of pinion members mounted in spaced relation thereon, one of which has right hand helical teeth and the other left hand helical teeth, a driven shaft, a pair of gear wheel members mounted thereon each having double helical teeth, a pair of intermediate speed shafts, gear wheels on one of such shafts which transmit power from one of said pinion members to one of said gear wheel members, and gear wheels on the other of such shafts which transmit power from the other of said pinion members to the other of said gear wheel members.

15. In combination, a low speed shaft, a pair of gear wheel members mounted thereon, a high speed shaft, a pair of pinion members mounted thereon, one on each side of the gear wheel members, a pair of axially alined intermediate speed shafts, low speed pinion members mounted on the adjacent ends of said axially alined shafts and meshing with said low speed gear wheel members, and high speed gear wheel members mounted on other ends of said axially alined shafts and meshing with said high speed pinion members.

16. In combination, a low speed shaft, a pair of gear wheel members mounted thereon, a high speed shaft, a pair of pinion members mounted thereon, one on each side of the gear wheel members, a pair of axially alined intermediate speed shafts, low speed pinion members mounted on the adjacent ends of said axially alined shafts and meshing with said low speed gear wheel members, and high speed gear wheel members mounted on the other ends of said axially alined shafts and meshing with said high speed pinion members, said low speed pinion members and low speed gear wheel members being of the double helical type and said high speed pinion members and high speed gear wheel members being of the single helical type.

17. In a gearing, the combination of a high speed shaft, a pair of pinion members mounted thereon, one of which has right hand helical teeth and the other left hand helical teeth, a low speed shaft, a pair of gear wheel members thereon, each of which has double helical teeth, a pair of intermediate speed shafts, gear wheels on one of said intermediate speed shafts which transmit power between one of said pinion members and one of said gear wheel members, and gear wheels on the other of said intermediate speed shafts which transmit power between the other of said pinion members and the other of said gear wheel members, the gear wheels on said intermediate speed shafts having teeth to correspond to the members with which they mesh.

18. In a gearing, the combination of a high speed shaft, a pair of pinion members mounted thereon, one of which has right hand helical teeth and the other left hand helical teeth, a low speed shaft, a pair of gear wheel members thereon each having double helical teeth, an intermediate speed shaft associated with each pinion member, gear wheels on each such intermediate speed shaft for transmitting power from a pinion member to a low speed gear wheel member, and means for balancing the axial thrusts on said intermediate speed shafts occasioned by the right and left hand helical teeth of said pinion members.

19. In a gearing, the combination of a high speed shaft, a pair of pinion members mounted thereon, one of which has right hand helical teeth and the other left hand helical teeth, a low speed shaft, a pair of gear wheel members thereon, an intermediate speed shaft associated with each pinion member, gear wheels on each such intermediate speed shaft for transmitting power from a pinion member to a low speed gear wheel member, said low speed gear wheel members and the gear wheels meshing therewith having right hand and left hand helical teeth thereon which are unequal as to width so as to balance the axial thrust on said intermediate shafts.

20. In a gearing, right hand and left hand helical pinion members, means connecting them which permits said members to adjust themselves relatively to each other, a low speed shaft, a plurality of intermediate speed shafts through which power is transmitted between said pinion members and the low speed shaft, and a single helical gear wheel on each intermediate speed shaft which meshes with one of said pinion members.

21. In a gearing, a right hand and a left hand helical pinion member, means connecting them which permits said members to adjust themselves relatively to each other, a low speed shaft, gear wheel means thereon, an intermediate speed shaft, a right hand helical gear thereon which meshes with said right hand helical pinion member only, a second intermediate speed shaft, a left hand helical gear wheel thereon which meshes with said left hand pinion member only, and pinions on each of said intermediate speed shafts which mesh with said low speed gear wheel means.

22. In a gearing, a high speed pinion comprising two members one of which has right hand helical teeth and the other left hand helical teeth, means connecting said pinions which permit them to adjust themselves relatively to each other, a low speed shaft, gear wheel means thereon, intermediate speed shafts through which power is transmitted between the pinion members and the gear wheel means, and a gear wheel with single helical teeth and a low speed pinion on each of said intermediate speed shafts, each of said single helical gear wheels meshing with one only of said pinion members.

23. In a gearing, right hand and left hand helical pinion members, means connecting said members whereby they can adjust themselves relatively to each other, a low speed shaft, two gear wheel members thereon each having double helical teeth, an intermediate speed shaft associated with each pinion member, and helical gear wheel means on each intermediate speed shaft for transmitting power between such pinion member and a gear wheel member.

24. In combination, a low speed shaft, gear wheel means mounted thereon, a pair of pinion members one on each side of the gear wheel means, means connecting said pinion members whereby they can adjust themselves relatively to each other, a pair of intermediate speed shafts, low speed pinion members mounted on said intermediate speed shafts and meshing with said low speed gear wheel means, and a high speed gear wheel member mounted on each of said intermediate speed shafts and meshing with one only of said high speed pinion members.

25. In a gearing, a pair of pinion members, a length of shaft connecting them whereby said pinion members can adjust themselves relatively to each other, one of said pinion members having right hand helical teeth and the other left hand helical teeth, a low speed shaft, double helical gear wheel means thereon, a pair of intermediate speed shafts, gear wheels on one of said intermediate speed shafts which transmit power between one of said pinion members only and said gear wheel means, and gear wheels on the other of said intermediate speed shafts which transmit power between the other of said pinion members only and said gear wheel means.

26. In a gearing, the combination of a high speed shaft, a plurality of pinion members thereon, a low speed shaft, a plurality of intermediate speed shafts, and gear wheel means on each intermediate speed shaft which transmits power from one only of said pinion members to said low speed shaft.

27. In a gearing, the combination of a high speed shaft, two helical pinion members thereon, a low speed shaft, gear wheel means thereon, an intermediate speed shaft, a helical gear wheel thereon which meshes with one only of said helical pinion members, a second intermediate speed shaft, a helical gear wheel thereon which meshes with the other only of said helical pinion members, and low speed pinions on each of said intermediate shafts through which power is transmitted to said low speed gear wheel means.

In witness whereof, I have hereunto set my hand this 20th day of June, 1918.

KARL ALQUIST.